US 12,179,351 B2

United States Patent
Motokado et al.

(10) Patent No.: US 12,179,351 B2
(45) Date of Patent: Dec. 31, 2024

(54) INDUSTRIAL ROBOT WITH RETROFITTABLE GEAR

(71) Applicant: FANUC CORPORATION, Yamanashi (JP)

(72) Inventors: Tomoyuki Motokado, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 103 days.

(21) Appl. No.: 17/997,569

(22) PCT Filed: May 14, 2021

(86) PCT No.: PCT/JP2021/018412
§ 371 (c)(1),
(2) Date: Oct. 31, 2022

(87) PCT Pub. No.: WO2021/235347
PCT Pub. Date: Nov. 25, 2021

(65) Prior Publication Data
US 2023/0219215 A1 Jul. 13, 2023

(30) Foreign Application Priority Data

May 21, 2020 (JP) ................................. 2020-088591

(51) Int. Cl.
*B25J 17/02* (2006.01)
*B25J 9/10* (2006.01)
*B25J 19/00* (2006.01)

(52) U.S. Cl.
CPC ........... *B25J 9/102* (2013.01); *B25J 17/0283* (2013.01); *B25J 19/0029* (2013.01); *B25J 19/0062* (2013.01)

(58) Field of Classification Search
CPC .......................... B25J 17/0283; B25J 19/0029
See application file for complete search history.

(56) References Cited

U.S. PATENT DOCUMENTS

| 2005/0281660 A1* | 12/2005 | Nihei | ................... B25J 19/0025 414/735 |
| 2006/0104790 A1* | 5/2006 | Inoue | ................... B25J 19/0025 414/737 |
| 2019/0305618 A1* | 10/2019 | Mizukoshi | ............. H02K 7/003 |

FOREIGN PATENT DOCUMENTS

| JP | H08-159241 A | 6/1996 |
| JP | 2005-271003 A | 10/2005 |

(Continued)

OTHER PUBLICATIONS

International Search Report issued in PCT/JP2021/018412; mailed Jul. 20, 2021.

*Primary Examiner* — Charles A Fox
*Assistant Examiner* — Gregory T Prather
(74) *Attorney, Agent, or Firm* — Studebaker & Brackett PC (57) ABSTRACT

Provided is an industrial robot in which a gear for causing a work tool to rotate can easily be retrofitted to a robot without requiring work to adjust backlash. The present invention comprises: a first wrist element that, at the distal end of a front arm of a robot, is capable of rotating about a first axis following the longitudinal direction of the front arm; a second wrist element that, at the first wrist element, is capable of rotating about a second axis intersecting the first axis in a roughly perpendicular manner; a third wrist element that, at the second wrist element, is capable of rotating about a third axis extending from the intersection point of the first and second axes in a direction roughly perpendicular to the direction in which the second axis extends; a first gear that is attached to the third wrist element coaxially with the third axis and that is capable of rotating about the third axis; a second gear that is driven by rotation of the first gear due to meshing with the first gear and that is capable of rotating; and a case secured to the second wrist (Continued)

element. The second gear is attached to the case via a bearing so as to be capable of rotating about a fourth axis positioned at a prescribed distance relative to the third axis.

7 Claims, 7 Drawing Sheets

(56) References Cited

FOREIGN PATENT DOCUMENTS

| | | |
|---|---|---|
| JP | 2005-342860 A | 12/2005 |
| JP | 2006-007409 A | 1/2006 |
| JP | 2006-015360 A | 1/2006 |
| JP | 2006-051581 A | 2/2006 |
| JP | 2006-068806 A | 3/2006 |
| JP | 2009-028875 A | 2/2009 |
| JP | 2014-018929 A | 2/2014 |

* cited by examiner

INDUSTRIAL ROBOT WITH RETROFITTABLE GEAR

TECHNICAL FIELD

The present invention relates to an industrial robot.

BACKGROUND ART

In an industrial robot (hereinafter simply referred to as "a robot"), in many cases, a work tool is attached to a distal end of a front arm of the robot, and a linear body including at least one of wiring and piping is used to supply a material such as air, energy such as electricity, or a signal to the work tool (see, for example, Japanese Unexamined Patent Application, Publication No. 2006-7409).

The work tool is attached to a tip of a rotary axis constituted by a gear (second gear) that rotates with a gear (first gear) of the rotary axis disposed at the distal end of the front arm of the robot. The second gear is disposed offset on a side of the first gear and meshes with the first gear. The linear body is inserted into a hollow portion provided along an axis of the second gear and connected to the work tool. Thereby, the robot rotates the second gear that is a final rotary axis at a high speed, in a high speed visual tracking system or the like.

Patent Document 1: Japanese Unexamined Patent Application, Publication No. 2006-7409

DISCLOSURE OF THE INVENTION

Problems to be Solved by the Invention

A second gear is retrofitted to mesh with a first gear provided in advance at a distal end of a front arm of a robot. However, backlash occurs in a meshing part between the gears, and hence, when the second gear is retrofitted, a complicated work for adjusting the backlash is required. Therefore, it is desirable that a gear for causing a work tool to rotate can easily be retrofitted to a robot without requiring work to adjust backlash.

Means for Solving the Problems

An industrial robot according to one aspect of the present disclosure comprises: a first wrist element that is provided at a distal end of a front arm of the robot in a manner rotatable about a first axis following a longitudinal direction of the front arm; a second wrist element that is provided at the first wrist element in a manner rotatable about a second axis intersecting the first axis in a substantially perpendicular manner; a third wrist element that is provided at the second wrist element in a manner rotatable about a third axis extending from an intersection point of the first and second axes in a direction substantially perpendicular to a direction in which the second axis extends; a first gear that is attached to the third wrist element concentrically with the third axis and that is provided rotatably about the third axis; a second gear that is provided to be rotatable with rotation of the first gear by meshing with the first gear; and a case secured to the second wrist element. The second gear is attached to the case via a bearing to be rotatable about a fourth axis positioned at a prescribed distance relative to the third axis.

Effects of the Invention

According to one aspect, there can be provided an industrial robot in which a gear for causing a work tool to rotate can easily be retrofitted to the robot without requiring work to adjust backlash.

PREFERRED MODE FOR CARRYING OUT THE INVENTION

Figure 1:
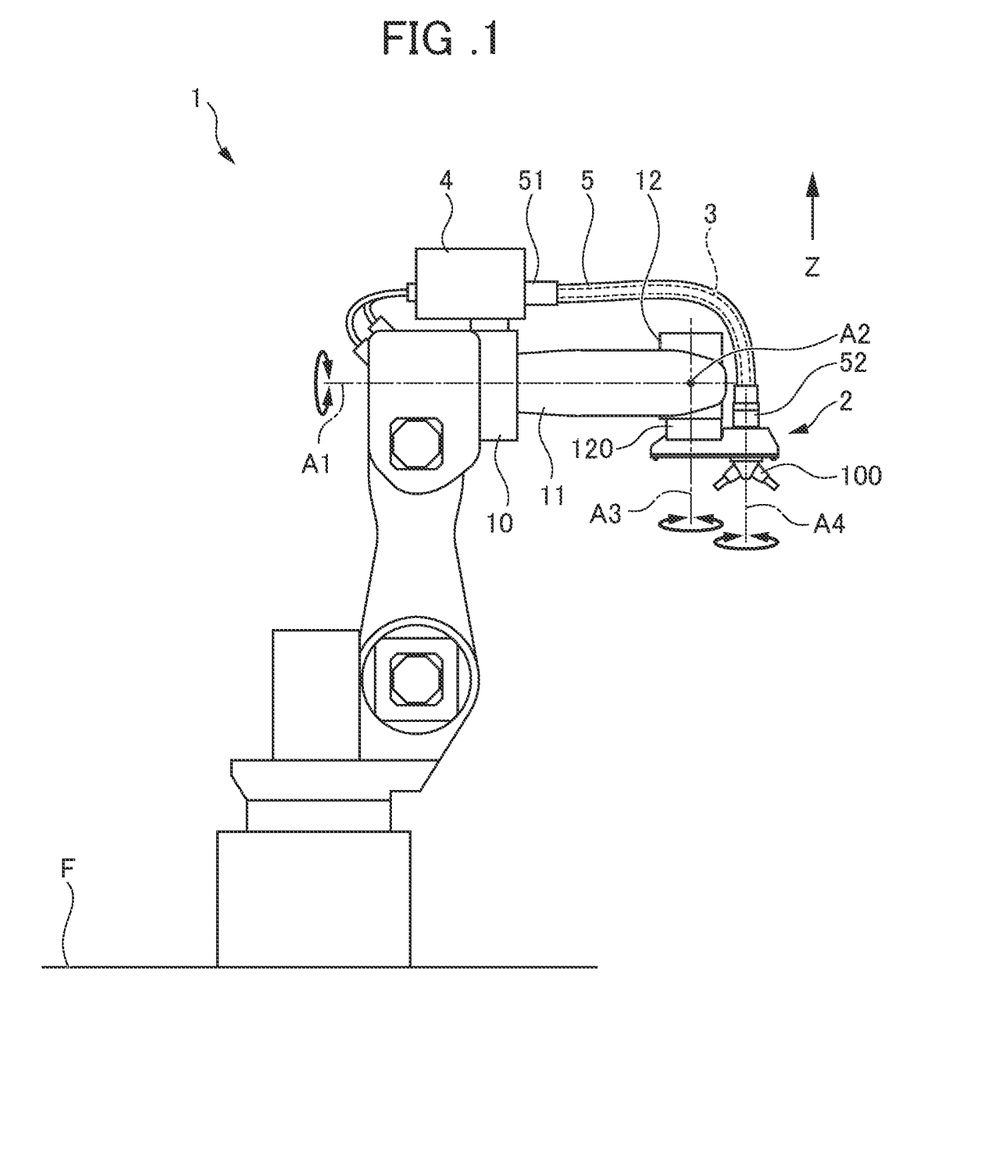
FIG. 1 is a front view of an industrial robot.
Figure 2:
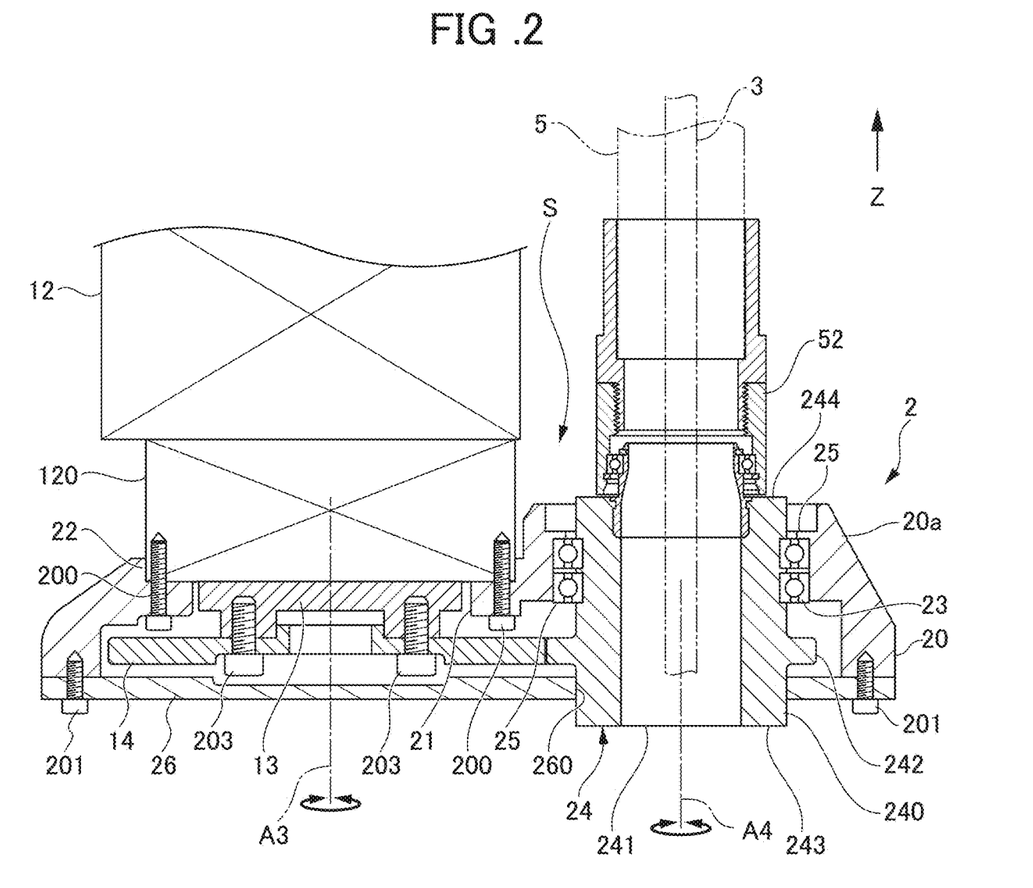
FIG. 2 is a cross-sectional view of a rotator unit of the industrial robot.

Hereinafter, description will be made as to embodiments of the present disclosure with reference to the drawings. FIG. 1 is a front view of an industrial robot. FIG. 2 is a cross-sectional view of a rotator unit of the industrial robot. A Z-direction indicated by an arrow in each of the following figures indicates an upward direction perpendicular to a floor surface F on which a robot 1 is installed.

The robot 1 shown in the present embodiment is a handling robot having six rotary axes and controlled by a robot controller (not shown). The robot 1 includes a first wrist element 11, a second wrist element 12, a third wrist element 13, and a rotator unit 2 at a distal end of a front arm 10 disposed on an arm distal end side.

The first wrist element 11 is formed in an arm shape protruding long from the distal end of the front arm 10 along a longitudinal direction (left-right direction in FIG. 1) of the front arm 10. The first wrist element 11, at the front arm 10, is provided rotatably about a first axis A1 along the longitudinal direction of the front arm 10.

The second wrist element 12 is formed in a rectangular box shape and attached to a tip of the first wrist element 11. The second wrist element 12, at the first wrist element 11, is provided rotatably about a second axis A2 intersecting the first axis A1 in a substantially perpendicular manner, the first axis being a rotary axis of the first wrist element 11. The second wrist element 12 includes a cylindrical portion 120 protruding downward in FIG. 1 along a length direction of the second wrist element 12.

The third wrist element 13 includes a substantially disk-shaped member and is attached concentrically to the cylindrical portion 120 of the second wrist element 12. The third wrist element 13, at the second wrist element 12, is provided rotatably about a third axis A3 extending from an intersection point of the first axis A1 and the second axis A2 in a direction (up-down direction in FIG. 1) substantially perpendicular to a direction (perpendicular direction with respect to a paper surface in FIG. 1) in which the second axis A2 extends.

In the present embodiment, term "substantially perpendicular" is not limited to a strict perpendicular and means that the axes may be slightly inclined with respect to the perpendicular to such an extent that functions of the second wrist element 12 and the third wrist element 13 are not impaired.

As shown in FIG. 2, a first gear 14 is attached to the third wrist element 13 concentrically with the third axis A3 that is a rotary axis of the third wrist element 13. The first gear 14 has an outer diameter greater than an outer diameter of the third wrist element 13 and is provided rotatably about the third axis A3. The first gear 14 shown in the present embodiment includes a spur gear. However, the first gear 14 is not limited to the spur gear and may be an oblique gear or the like.

The rotator unit 2 includes a work tool 100 and is attached to a tip of the second wrist element 12. The work tool 100 is, for example, a hand or the like, and is disposed on a lower surface of the rotator unit 2 via a jig. A linear body 3 is connected to the work tool 100. The linear body 3 includes at least one of piping and wiring for supplying, to the work tool 100, a material such as air, energy such as electricity or a signal for driving the work tool 100. One end of the linear body 3 is connected to a solenoid valve box 4 attached to an upper part of the front arm 10. One end of the linear body 3 extends through the rotator unit 2 and is connected to the work tool 100. In FIGS. 1 and 2, one linear body 3 is shown. However, the linear body 3 may comprise a plurality of lines.

From the solenoid valve box 4 to the rotator unit 2, a conduit 5 made of a flexible tube is provided. Specifically, the robot 1 includes a first conduit attaching part 51 disposed near the front arm 10 and a second conduit attaching part 52 disposed on a rotator unit 2 side. The vicinity of the front arm 10 where the first conduit attaching part 51 is disposed is a zone around the first axis A1 in the vicinity of the front arm 10. Specifically, the first conduit attaching part 51 of the present embodiment is connected to the solenoid valve box 4 attached to an upper surface of the front arm 10. The second conduit attaching part 52 is rotatably connected to an after-mentioned second gear 24 provided in the rotator unit 2. The conduit 5 is provided over the first conduit attaching part 51 and the second conduit attaching part 52. The conduit 5 is rotatably attached to at least the second conduit attaching part 52 of the first conduit attaching part 51 and the second conduit attaching part 52. The linear body 3 is inserted into an interior of the conduit 5 and extends from the solenoid valve box 4 to the work tool 100.

As shown in FIG. 2, the rotator unit 2 includes a case 20 made of a metal. The case 20 is fixed to the cylindrical portion 120 of the second wrist element 12. The case 20 is provided with a lower part being noticeably opened and protrudes noticeably from the cylindrical portion 120 of the second wrist element 12 to a side in a direction substantially perpendicular to the third axis A3.

The case 20 includes a first opening 21 that opens circularly upward. The first opening 21 is provided to open concentrically with the third axis A3. The first opening 21 has an opening diameter smaller than an outer diameter of the cylindrical portion 120, which is cylindrical, of the second wrist element 12 but greater than an outer diameter of the third wrist element 13. With the case 20 fixed to the cylindrical portion 120 of the second wrist element 12, the first opening 21 surrounds an outer side of the third wrist element 13 in a radial direction.

On outside of the first opening 21, a fitting portion 22 including a stepped portion is provided. The fitting portion 22 has an inner diameter greater than the opening diameter of the first opening 21 and is provided on an upper surface of the case 20 to surround the first opening 21. The first opening 21 is provided to open concentrically at a bottom of the fitting portion 22. The inner diameter of the fitting portion 22 is substantially equal to the outer diameter of the cylindrical portion 120 of the second wrist element 12. The case 20 is mounted in the second wrist element 12 by fitting the fitting portion 22 in a circumference of the cylindrical portion 120 of the second wrist element 12 and is fixed to the cylindrical portion 120 of the second wrist element 12 with a plurality of bolts 200. Thus, the case 20 is attached by fitting the fitting portion 22 and the cylindrical portion 120 of the second wrist element 12, so that the case 20 is easily positioned, and a work of assembling the rotator unit 2 is simplified.

The upper surface of the case 20 on a side of the first opening 21 includes a raised portion 20a raised upward along the third axis A3 above the fitting portion 22. The raised portion 20a of the case 20 includes a second opening 23 that opens circularly upward. A fourth axis A4, which is a central axis of the second opening 23, is disposed at a prescribed distance from the fitting portion 22 with a predetermined tolerance. The fourth axis A4 extends substantially parallel to the third axis A3 with respect to the third axis A3 which is a central axis of the first opening 21.

In the second opening 23, the second gear 24, which is a final rotary axis of the robot 1, is attached to the second opening 23 to mesh with the first gear 14 inside the case 20. The second gear 24 includes a cylindrical portion 240 and a tooth portion 242 provided on a circumference of the cylindrical portion 240. Furthermore, the cylindrical portion 240 includes a hollow portion 241 disposed along the fourth axis A4. The second gear 24 is attached to the second opening 23 via an appropriate number of bearings 25 provided on an inner circumference of the second opening 23.

The case 20 is sealed off with a cover 26 in a state of internally housing the first gear 14 and the second gear 24 together with a lubricant such as grease. The cover 26 is fixed to a lower end of the case 20 shown in the drawing with a plurality of bolts 201. By housing, in the case 20, the first gear 14 and the second gear 24 together with the lubricant, wear on the first gear 14 and the second gear 24 is suppressed.

The cover 26 includes a circular opening 260. A tip surface 243 of the cylindrical portion 240 of the second gear 24 is inserted into the opening 260 and exposed to outside of the cover 26. The tip surface 243 of the cylindrical portion 240 constitutes a mounting surface of the work tool 100 (not shown in FIG. 2).

The cylindrical portion 240 of the second gear 24 protrudes upward from the second opening 23 of the case 20. The second conduit attaching part 52 is connected to the cylindrical portion 240 protruding upward from the second opening 23. Thereby, the interior of the conduit 5 and the hollow portion 241 communicate. The linear body 3 inserted into the conduit 5 is guided from the solenoid valve box 4 attached to the front arm 10 through the hollow portion 241 to the work tool 100. Therefore, the linear body 3 is drawn out in a direction opposite to a direction in which the second wrist element 12 is oriented such that a tip portion of the work tool 100 faces straight downward.

The conduit 5, between the first conduit attaching part 51 and the second conduit attaching part 52, extends along the first wrist element 11 on a side of the first wrist element 11 opposite to the tip portion of the work tool 100 and is disposed so as not to come in contact with a body of the robot 1. Thereby, the linear body 3 can be mounted on the robot 1 with stable handling.

The second opening 23 of the case 20 to which the second gear 24 is attached is disposed in the raised portion 20a of the case 20. The hollow portion 241 of the second gear 24 includes a rear end surface 244 protruding upward from the second opening 23. Therefore, the second conduit attaching part 52 connected to the hollow portion 241 of the second gear 24 is disposed closer to a second wrist element 12 side than to the third wrist element 13 with respect to a securing portion between the fitting portion 22 of the case 20 and the cylindrical portion 120 of the second wrist element 12. Thereby, a connecting portion between the second gear 24 and the second conduit attaching part 52 is disposed closer to the second wrist element 12 side than to the third wrist element 13. As a result, a work to attach the second conduit attaching part 52 to the hollow portion 241 of the second gear 24 can be easily performed.

The raised portion 20a of the case 20 and the connecting portion between the second gear 24 and the second conduit attaching part 52 are arranged in a space S on a side of the cylindrical portion 120 of the second wrist element 12. Thereby, the raised portion 20a and the connecting portion between the second gear 24 and the second conduit attaching part 52 can be arranged close to the second wrist element 12. As a result, the rotator unit 2 can be compactly constituted.

Furthermore, since the second opening 23 to which the second gear 24 is attached is disposed in the raised portion 20a of the case 20, the second opening 23 can rotatably support the second gear 24 with the bearing 25 over a relatively long distance along an extending direction of the fourth axis A4. Therefore, the second gear 24 is stably rotatable.

Next, an assembling method in attaching the rotator unit 2 to the second wrist element 12 will be described with reference to FIGS. 3 to 6. In order to simplify description, FIGS. 3 to 6 only show the second wrist element 12, the third wrist element 13 and the rotator unit 2 in the robot 1. In FIGS. 3 to 6, the second wrist element 12, the third wrist element 13 and the rotator unit 2 are shown upside down with respect to FIGS. 1 and 2.

Figure 3:
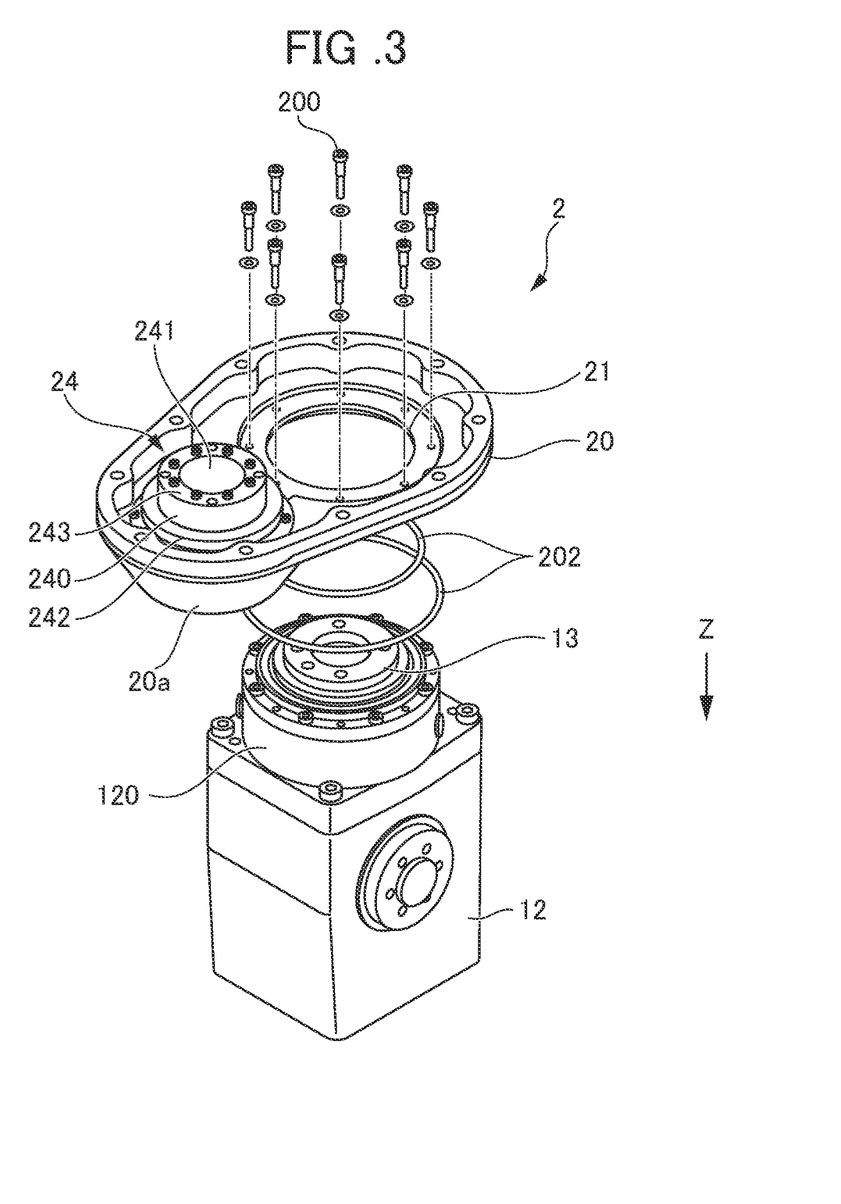
FIG. 3 is a perspective view illustrating a method of assembling the rotator unit of the industrial robot.

First, as shown in FIG. 3, the first opening 21 of the case 20 of the rotator unit 2 is mounted, concentrically via O-rings 202, on the cylindrical portion 120 of the second wrist element 12 to which the third wrist element 13 is attached. Specifically, the case 20 is mounted on the cylindrical portion 120 by fitting, in the cylindrical portion 120, the fitting portion 22 concentrically disposed in the first opening 21 of the case 20. At this time, in the case 20, the second gear 24 is rotatably attached, in advance, to the second opening 23 via the bearing 25 (not shown in FIG. 3). The case 20 mounted on the cylindrical portion 120 is fixed to the cylindrical portion 120 with the plurality of bolts 200.

Figure 4:
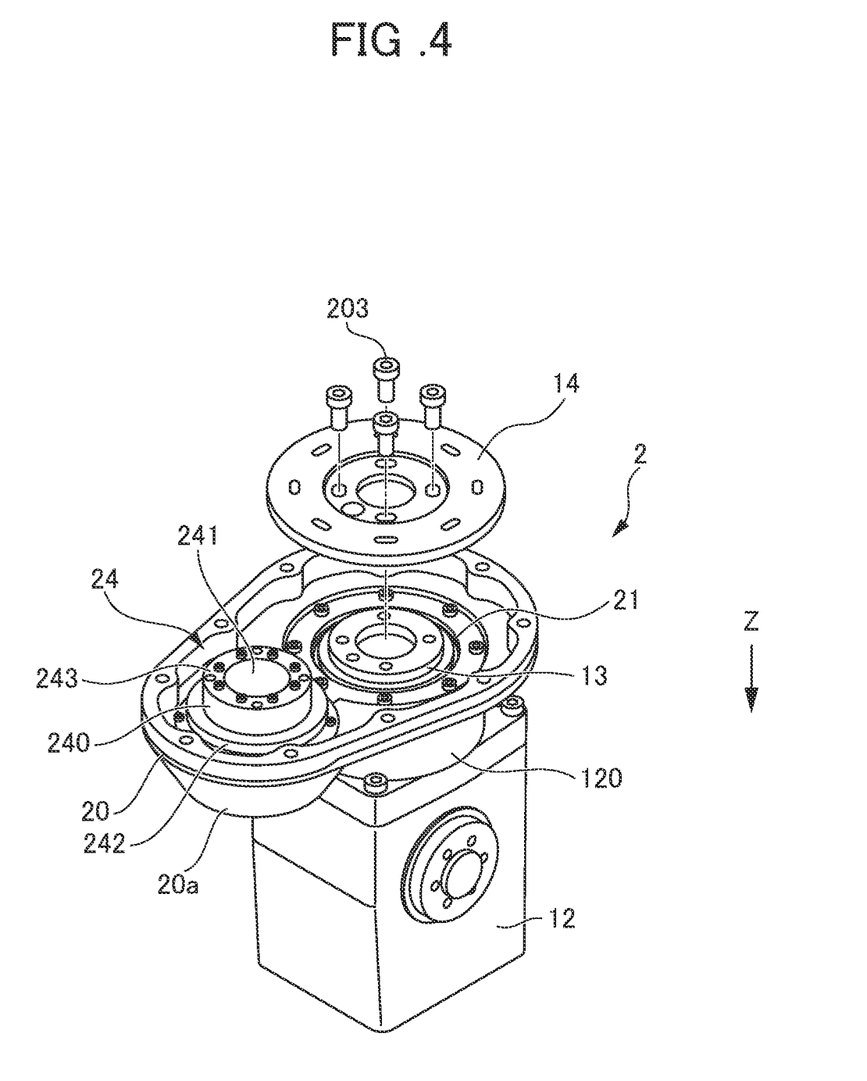
FIG. 4 is a perspective view illustrating the method of assembling the rotator unit of the industrial robot.

Next, as shown in FIG. 4, the first gear 14 is concentrically mounted on the third wrist element 13 disposed inside the case 20 and fixed to the third wrist element 13 with a plurality of bolts 203. The fourth axis A4, which is a central axis of the second gear 24, is disposed at a prescribed distance from the fitting portion 22 of the case 20 with a predetermined tolerance. The prescribed distance is a distance at which the second gear 24 is disposed so that the tooth portion 242 of the second gear 24 properly meshes with a tooth portion of the first gear 14 inside the case 20. Therefore, when the first gear 14 is attached to the third wrist element 13, the first gear 14 and the second gear 24 are arranged to mesh with each other.

Figure 5:
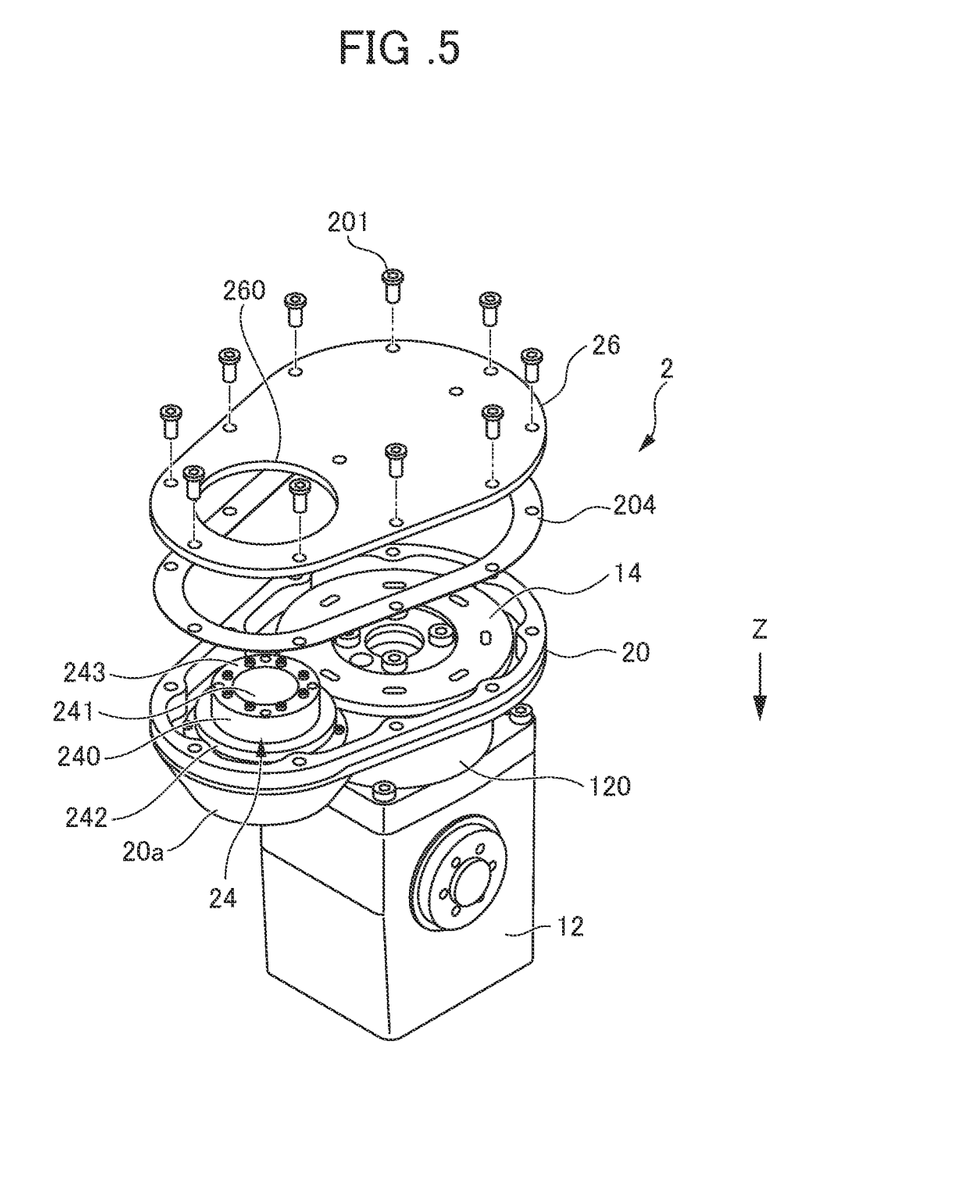
FIG. 5 is a perspective view illustrating the method of assembling the rotator unit of the industrial robot.

Next, an interior of the case 20 to which the first gear 14 and the second gear 24 are attached is filled with a lubricant such as grease. Thereafter, as shown in FIG. 5, the cover 26 is mounted on the case 20 via a packing 204 and fixed to the case 20 with the plurality of bolts 201. The tip surface 243 of the cylindrical portion 240 of the second gear 24 is exposed through the opening 260 of the cover 26 to outside of the case 20.

Figure 6:
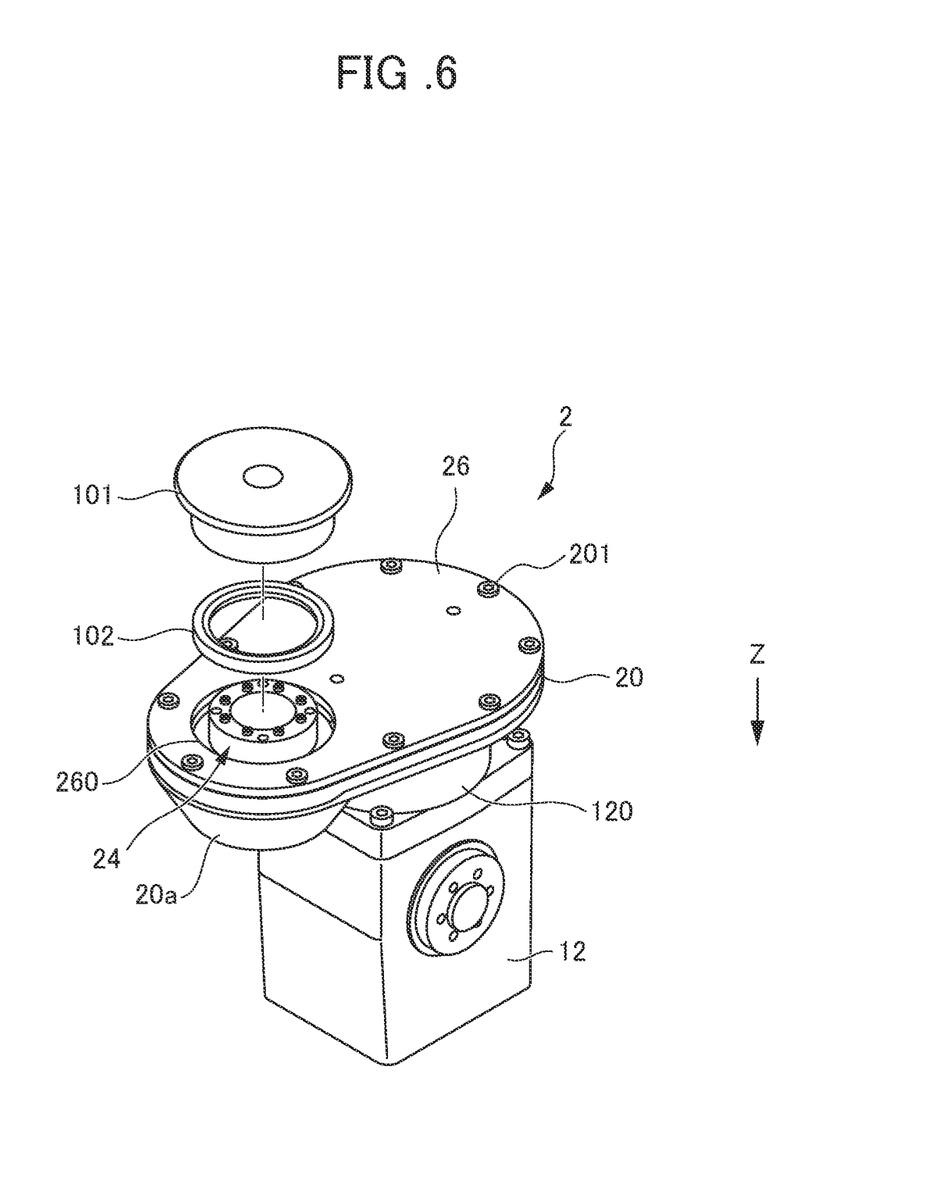
FIG. 6 is a perspective view illustrating the method of assembling the rotator unit of the industrial robot.

As shown in FIG. 6, a jig 101 is attached, via an oil seal 102, to the second gear 24 in the rotator unit 2 in which the case 20 is thus sealed off with the cover 26. The work tool 100 is attached to the jig 101. Thereby, the robot 1 includes the work tool 100 that rotates with rotation of the third wrist element 13.

The case 20 of the rotator unit 2 is positioned and attached to the cylindrical portion 120 of the second wrist element 12 by fitting in the fitting portion 22. Inside the case 20, the second gear 24 that meshes with the first gear 14 and is driven by the first gear 14 to rotate is attached to the second opening 23 disposed at a prescribed distance from a predetermined intersection with the third axis A3 which is the rotary axis of the first gear 14, the second gear being rotatable about the fourth axis A4. Thereby, simply by attaching the first gear 14 to the third wrist element 13, the first gear 14 and the second gear 24 attached to the case 20 in advance are appropriately positioned and meshed together. Therefore, the rotator unit 2 can easily be retrofitted to the distal end of the front arm 10 of the robot 1 without requiring the work to adjust backlash after both the gears are attached.

Figure 7:
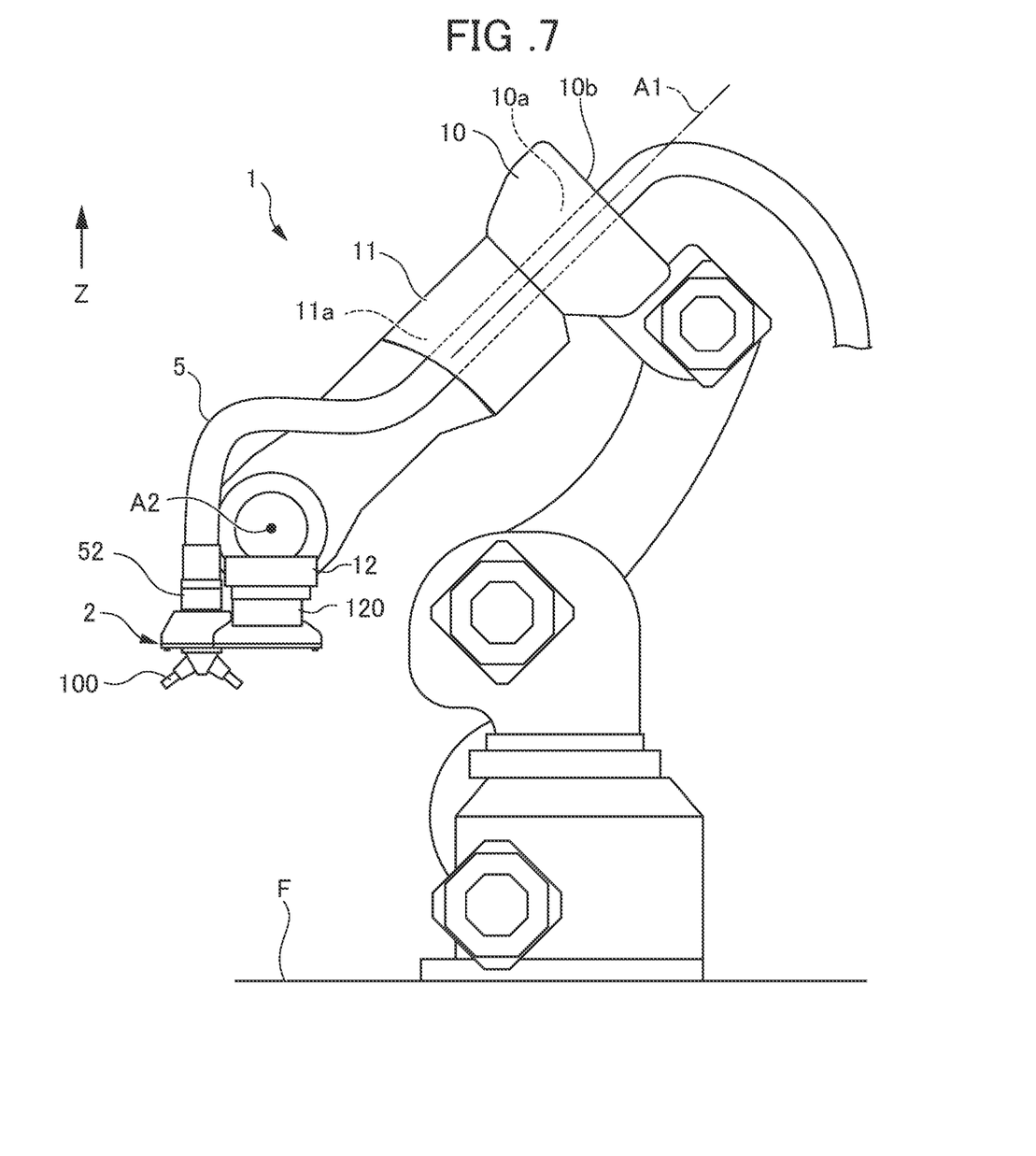
FIG. 7 is a front view of an industrial robot according to another embodiment.

In the embodiment described above, the conduit 5 extends outside the first wrist element 11 along the first axis A1 and is connected to the solenoid valve box 4 attached to the upper part of the front arm 10. However, the conduit 5 may be inserted into a hollow hole 10a provided in the front arm 10 as shown in FIG. 7. The hollow hole 10a is provided concentrically with the first axis A1 passing through a center of the front arm 10. In the first wrist element 11, a communication hole 11a that communicates with the hollow hole 10a of the front arm 10 is provided from a connection end to the front arm 10 to a middle portion of the first wrist element 11. The conduit 5 extends along the first axis A1 inside the hollow hole 10a of the front arm 10 and inside the communication hole 11a of the first wrist element 11. The first conduit attaching part 51 is disposed at a rear 10b of the front arm 10 and further extends rearward from the rear 10b. The conduit 5 extending out from the communication hole 11a toward the tip of the first wrist element 11 is bent in an arc shape about and along the second axis A2 and connected to the rotator unit 2 by the second conduit attaching part 52.

By disposing the conduit 5 in this way, behavior of the conduit 5 during operation of the first wrist element 11 can be stabilized while keeping a minimum radius of curvature of the conduit 5 around the second axis A2 in a state of having the above-described features.

The invention claimed is:

1. An industrial robot comprising:
 a first wrist element that is provided at a distal end of a front arm of the robot in a manner rotatable about a first axis following a longitudinal direction of the front arm;
 a second wrist element that is provided at the first wrist element in a manner rotatable about a second axis intersecting the first axis in a substantially perpendicular manner;
 a third wrist element that is provided at the second wrist element in a manner rotatable about a third axis extending from an intersection point of the first and second axes in a direction substantially perpendicular to a direction in which the second axis extends;

a first gear that is attached to the third wrist element concentrically with the third axis and is provided rotatably about the third axis;

a second gear that is provided to be rotatable with rotation of the first gear by meshing with the first gear; and a case secured to the second wrist element via a stepped portion of a fitting portion of the case, wherein the second gear is attached to the case via a bearing in a manner rotatable about a fourth axis positioned at a prescribed distance relative to the third axis.

2. The industrial robot according to claim 1, wherein the fitting portion fits with the second wrist element, and the second gear is disposed at a prescribed distance from the fitting portion, in the case.

3. The industrial robot according to claim 1, wherein the case internally houses the first gear and the second gear together with a lubricant.

4. The industrial robot according to claim 1, wherein the second gear includes a hollow portion along the fourth axis, and a work tool is attached to a tip of the second gear, the industrial robot further comprises:
- a linear body including at least one selected from wiring and piping connected to the work tool;
- a flexible conduit into which the linear body is inserted, the conduit guiding the linear body from the front arm through the hollow portion to the work tool;
- a first conduit attaching part disposed near the front arm; and
- a second conduit attaching part connected to the second gear, wherein the linear body is received in the second conduit attaching part such that the linear body extends in a direction opposite to a direction in which the second wrist element is oriented such that a tip portion of the work tool faces straight downward, one end of the conduit is attached to the first conduit attaching part, and one other end of the conduit is attached to the second conduit attaching part, the conduit extends along the first wrist element on a side of the first wrist element opposite to the tip portion of the work tool between the first conduit attaching part and the second conduit attaching part, and is disposed so as not to come in contact with a body of the robot, and at least the other end of the conduit is rotatably attached in the second conduit attaching part.

5. The industrial robot according to claim 4, wherein the second conduit attaching part is disposed closer to a side of the second wrist element than to the third wrist element.

6. The industrial robot according to claim 4, wherein the conduit is inserted into a hollow hole provided in the front arm, and the first conduit attaching part is disposed at a rear of the front arm.

7. The industrial robot according to claim 1, wherein the case includes a raised portion extending upward alongside the second wrist element.

\* \* \* \* \*